July 23, 1946.  C. H. McCLAIN  2,404,597
TEMPERATURE CONTROLLER
Filed April 21, 1943  2 Sheets-Sheet 1

INVENTOR
CLIFFORD H. McCLAIN
BY
ATTORNEYS

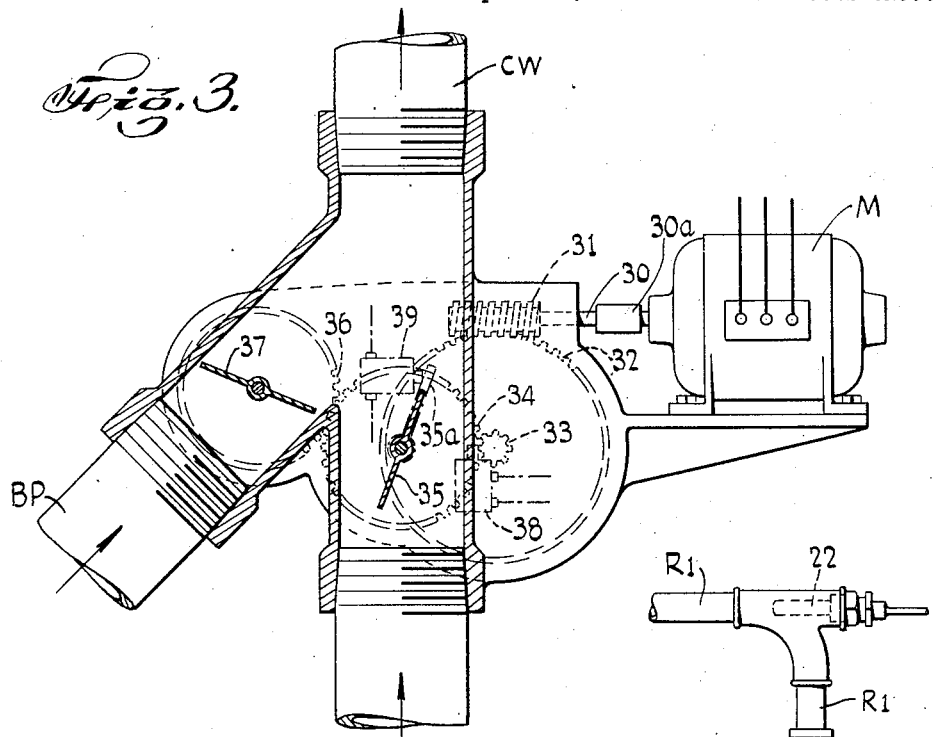
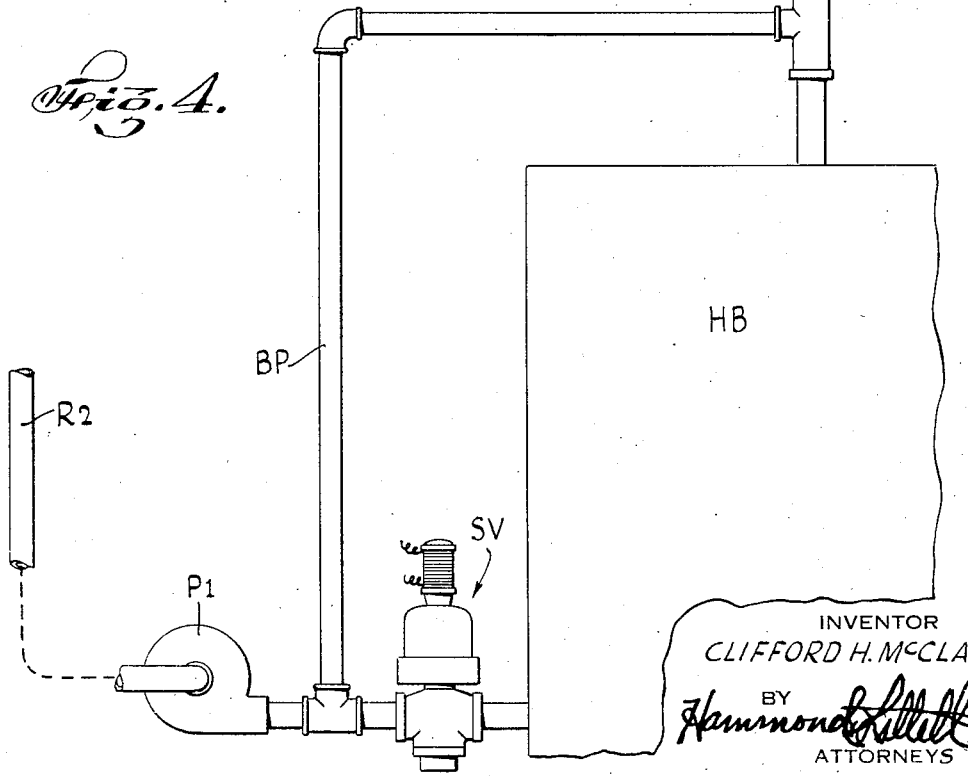

Patented July 23, 1946

2,404,597

UNITED STATES PATENT OFFICE 2,404,597

TEMPERATURE CONTROLLER

Clifford H. McClain, Lansdowne, Pa., assignor to Hoffman Specialty Co., Indianapolis, Ind., a corporation of Illinois Application April 21, 1943, Serial No. 483,831

7 Claims. (Cl. 236—91)

This invention relates to temperature controllers and to systems using the same to control the variations in one temperature in a predetermined relation to variations in another, commonly for the regulation of a third temperature affected by such variations. The invention has many applications and is advantageous, for example, for the control of hot water heating systems or cooling systems for homes or other buildings where it is desired to keep room temperatures approximately constant under changing outdoor weather conditions.

Temperature controllers have been provided heretofore which embody lever means movable to regulate the temperature of a heating fluid according to the varying positions of two or more thermally responsive expansion devices. In applying such controllers to hot water heating systems, the bulbs of two expansion devices are located, respectively, in the circulating hot water and in the air outside the enclosure being heated. The expansion devices work against arms of the controller lever and cause it, by certain movements, to operate a valve control switch or other means to change the temperature of the circulating water. The lever arms have a fixed operating ratio that establishes a linear relationship between changes in the temperature of the outdoor air and the temperature changes in the circulating water. Manually operated means have been provided also for changing the effective lengths of the lever arms by a lateral shifting of the fulcrum. When the position of the fulcrum is established, however, the controlled temperature is again varied linearly in accordance with variations in the controlling temperature.

If the lever arm ratio has been selected properly for a certain outdoor temperature and other use conditions, the controller will function at that temperature to control the circulating water so that it emits enough heat to counteract heat losses and keep the room temperature approximately uniform. On the other hand, when the outdoor temperature changes the water temperature is varied according to the fixed ratio, and the heat emission of the system then may not balance the heat loss. This unbalanced condition occurs in practice because, although the heat loss may vary directly as the difference between the outdoor temperature and the room temperature, the actual heat emission from such a system varies as an exponential or curvilinear function of the temperature variations of the heating medium rather than as a linear function of such temperature variations.

The present invention has as a primary object the provision of a temperature control device which is automatically operative to supply heat to a building at a temperature which will maintain the temperature of the building substantially constant under varying outdoor weather conditions. It is a more general object of the invention to supply the heat demands of a heat exchange system where the temperature of the heat supply medium must vary as a curvilinear function of variations in the temperature of a control medium. It is a special object of the invention to control automatically the temperature of a radiator or convector system in accordance with changes in the temperature of the outside atmosphere in such a manner as to supply heat to a building at a rate which will maintain its temperature substantially constant under variable outdoor weather conditions. Other objects and features of the invention will be obvious from its special embodiments as illustrated hereinafter.

To maintain the temperature of a building at 70° F. with a hot water heating system where the optimum demands for maintaining such a temperature are 150 B. t. u.'s per hour, the optimum temperature to maintain this supply of heat is water at a mean temperature of 170° F. (i. e., a temperature of 180° F. at the inlet and 160 F. at the outlet of the system); if the drop in water temperature in the circulating system is 20° F. between the incoming and outgoing water, then 7.5 lbs. of water must flow through the heating elements per hour to supply the necessary heat. It is known that the average temperature of the water necessary to supply a specific number of B. t. u.'s per hour is given by the formula:

$$t_a = 65 + \frac{105}{\sqrt[1.5]{\frac{150}{H}}}$$

where $t_a$ = average water temperature in convector
$H$ = heat out-put of convector in B. t. u. per hour.

and that the temperature of the water entering the system is given by the formula:

$$t_1 = t_a + .5 \frac{H}{W}$$

where $t_1$ = temperature of water entering convector
$H$ = heat out-put of convector in B. t. u. per hour
$W$ = constant water circulation in pounds per hour.

It is clear from these formulas that the relationship between the temperature of the water in the heat transfer system and the amount of heat generated or transferred is not a linear function but is in fact a curvilinear function of the temperature of the water. The graph representing the relationship between the temperature of such a system and the amount of heat supplied is known as the temperature curve. Since heat is exchanged with the surrounding atmosphere where a room temperature is constant in direct proportion to variations in the temperature of the surrounding atmosphere, it is seen that a temperature control device which regulates the temperature of a heating medium in proportion to variations in the temperature of the surrounding atmosphere will not maintain the temperature of a building constant, but will in fact cause the temperature of the building to vary or fluctuate. If the temperature of a building is to be maintained relatively constant, it is necessary to have a temperature control device of such flexibility that it is operative to vary the relationship between the temperature of the control medium and the heat supply medium in such a manner that the rate of heat emission will substantially follow the so-called temperature curve. It has not been possible to achieve this result with known temperature controllers.

My invention provides new and improved temperature controllers and heat exchange systems using the same, which are operative, for example, to control the temperature of a heating fluid so as to keep the heat emission of a heating system at all times approximately equal to the heat requirements as measured by a variable control temperature, such as that of the outdoor air. My invention thus contemplates heating systems which will keep room temperatures approximately constant under changing weather conditions. It also contemplates cooling systems operative to counteract heat gains by equivalent cooling effects over a wide range of outdoor or other control temperatures.

In the temperature controller of my invention I utilize lever means or the like to control the temperature of a heating medium, which lever means are positioned by two thermal expansion devices respectively responsive to temperature variations in the control and the heating medium. I provide means, however, which coact with the lever means and the thermal expansion devices in such a manner that the ratio between the temperature variations of the two media is subjected automatically to an infinite number of changes over the operative temperature ranges. For example, I may provide a cam or cams to coact with the levers and the expansion devices to automatically vary the effective lever arms and effectuate an infinite number of desired continual changes in the ratio between the temperature variations of the controlled and the controlling media.

By an appropriate adjustment of the contour of such coacting devices the temperature of the controlled medium may be regulated to approximate any desired curvilinear temperature curve even though parts of the curve may be straight.

There are various methods by which the appropriate contour of the cam surface may be obtained, including both analytical and graphical methods. It will be obvious that there are certain advantages in having these cams constructed as separate parts of the temperature controller since such controllers may then be adjusted to meet different control conditions by substituting appropriate cams. The cam may also be an integral part of the lever means.

In this manner I provide a temperature controller embodying a mechanism which automatically effectuates an infinite number of changes in the ratio between the temperature variations of the controlled temperature and the controlling temperature in conformity to a predetermined calculated or experimentally determined desired exponential or curvilinear relationship between such temperature variations. When my controller is applied to a hot water or similar heating system which is to have its temperature controlled by hot water controlled by temperature variations in the outside atmosphere, the temperature of the heating fluid may be regulated to maintain the heat emission of the system in conformity to the so-called temperature curve, i. e., equal to the heat demands of the space to be heated. In this way the temperature of a room or other enclosed spaced losing heat to the outside air may be maintained at any desired uniform or substantially uniform temperature.

Other features and advantages of my invention will be apparent from the following detailed description of a preferred and specific embodiment of my invention as illustrated in the drawings.

Figure 3 is a part sectional detail view of the control valves of the system illustrated in Figure 2.

Figure 4 is a diagrammatic representation of a hot water heating system using a different form of flow control valve.

Figure 1:
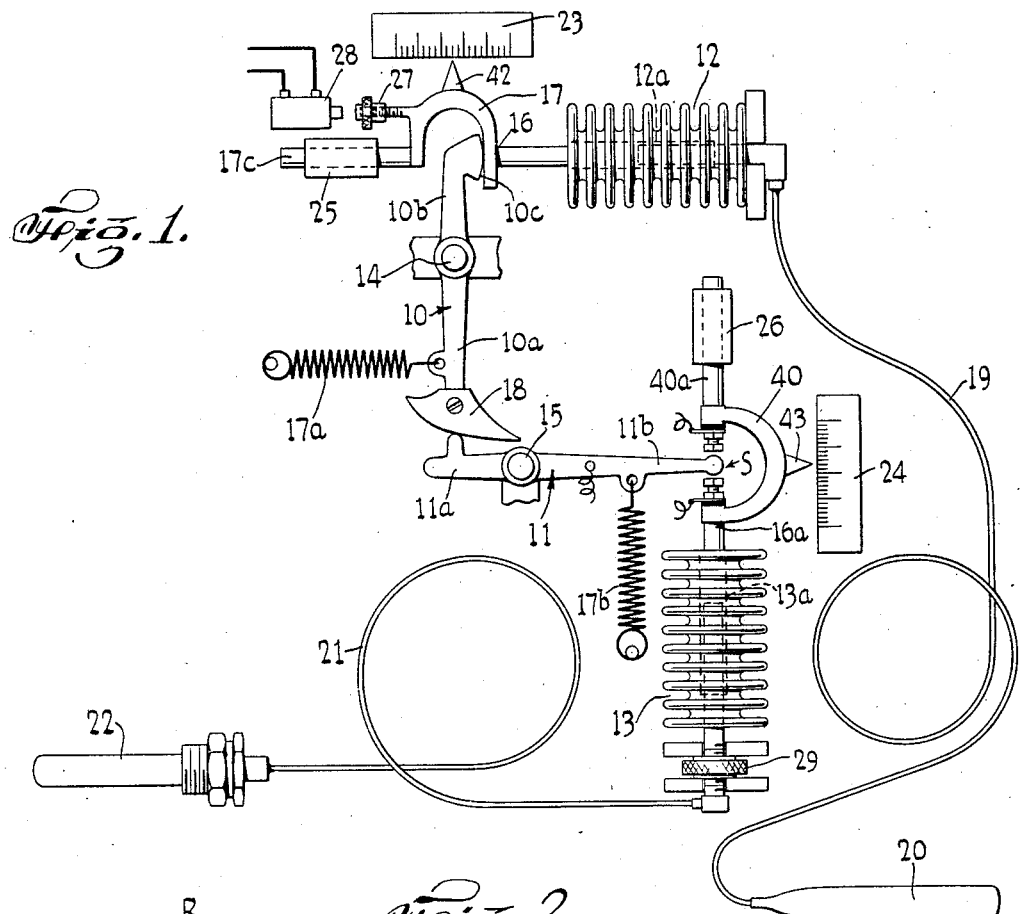
Figure 1 is a diagrammatic representaton of a temperature regulator embodying my invention.

As shown in Figure 1, the temperature contoller comprises two levers 10 and 11 and two thermostatic bellows 12 and 13, provided with internal guides 12a and 13a. Lever 10 has two oppositely extending arms 10a and 10b, and lever 11 has two oppositely extending lever arms 11a and 11b. Lever 10 rotates about a stationary pin 14 which acts as its fulcrum, while lever 11 rotates about a stationary pin 15 which acts as its fulcrum. The position of the levers at any time is determined by the relative position of extension element 16 of the bellows 12. Arm 10b of lever 10 is held in contact with the inner portion of a yoke 17, which contacts the extension element 16 by means of a coil spring 17a and the arm 11a of lever 11 normally is moved toward the cam at the lower end of the arm 10a of the lever 10 by spring 17b.

Extension element 16 is operated by thermosensitive bellows 12 connected through tube 19 to bulb 20 located in a medium of variable temperatures, such as the outside atmosphere, and extension element 16a is operated by thermo-sensitive bellows 13 connected through tube 21 to bulb 22 located in the medium to be controlled, such as the hot water, the bellows, the bulbs and the tubes being filled with a thermally expansive fluid.

Lever arm 10b has a curved surface 10c for contacting yoke 17, which surface may be so designed that the effective length of the lever arm 10a is always the same throughout the expansion and contraction range of bellows 12. Lever arm 10a is provided with an interchangeable compensating cam 18, which automatically varies the effective length of this lever arm, thereby effectuating a predetermined infinite variation in the relative movement of lever 11 and in the ratio between the temperature variations in the controlling medium and in the controlled medium.

It will be understood that a plurality of cams 18 may be provided and the proper cam installed to suit the requirements of the system at the location in which it is installed. It will also be understood that a cam or curved surface may be permanently fixed to the lever arm 10a and a similar or complementary cam surface may be placed on lever arm 11a.

The yoke 17 may be integrally or separably conected to the extension 16 and carries an extension 17c which is guided and slidably mounted in a guide 25, and the yoke 40 which may be integrally or separably connected with the extension 16a carries an extension 40a which is guided and slidably mounted in a guide 26.

Figure 2:
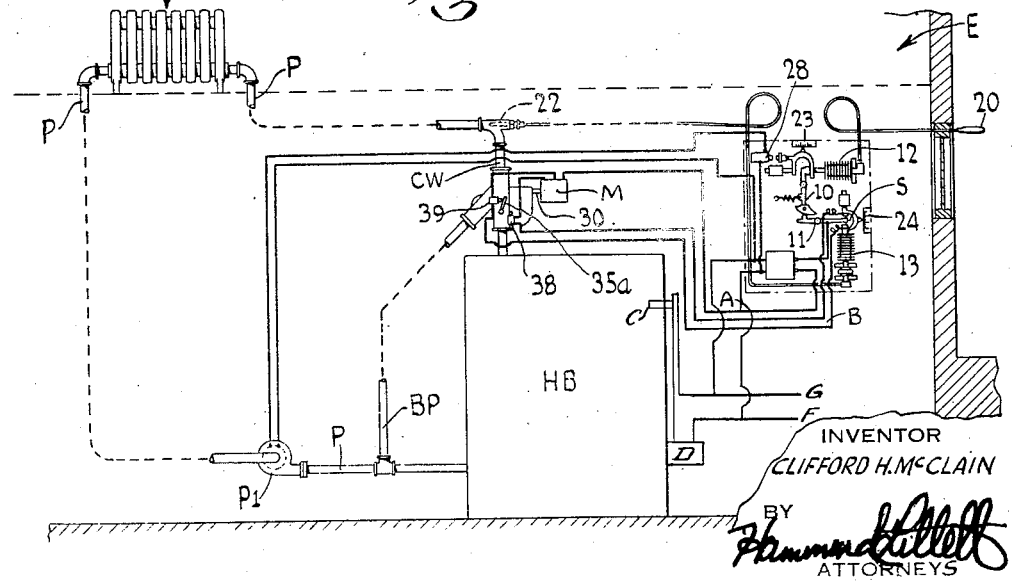
Figure 2 is a diagram of a heating system embodying the application of my invention to a continuously circulating hot water heating system.

Figure 2 shows the application of this type of controller to a forced feed circulation hot water heating system, in which hot water is circulated through pipes P and radiators R in an enclosure E by a circulating water pump P₁.

In this system the bulb 20 connected with the bellows 12 is located in the atmosphere outside the enclosure E and the bulb 22 is located in the supply water line CW. Hot water is supplied from a hot water boiler HB and the pipes P are arranged so that the water circulated by the pump P₁ may either pass through the boiler HB or through a by-pass BP or partially through the boiler and partially through the by-pass.

The boiler HB may be heated by conventional heating devices. Usually, it is preferable to maintain the boiler water at a substantially uniform temperature which may be achieved by using an oil burner regulated by a thermostat. As shown in Figure 2, oil burner D is provided with an electric motor which is controlled by the thermostat C, connected to power lines F and G. The thermostat C is so adjusted that it closes the electric circuit and turns on the electric motor of oil burner D whenever the water reaches a certain minimum temperature. Likewise, the reverse happens when the water reaches a desired maximum temperature.

Figure 3 shows in greater detail the flow control valves used in the heating system illustrated in Figure 2. The reversible motor M is connected by a shaft 30 having a friction slip connection 30a to a worm 31, which functions to operate a worm gear 32. Worm gear 32 has a pinion 33 which actuates the movement of operating gear 34 which in turn actuates movement in butterfly valve 35. Operating gear 34 meshes with operating gear 36 connected with the butterfly valve 37, so that when valve 35 is being moved to open position, valve 37 will be moved toward closed position, and when valve 35 is being moved toward closed position, valve 37 will be moved toward open position. The valve system is provided with stop switches 38 and 39 operated by an arm 35a connected to the shaft of the valve 35 to assure optimum operation of the valves and to stop their movement when they have reached fully open or fully closed positions without causing breakage of any parts. For instance, when butterfly valve 35 has reached the position where the flow of water through the pipe is either a maximum or a minimum, the operation of the motor M is discontinued by the arm 35a contacting one of the stop switches, shown at 38 and 39, to stop the motor.

As shown in Figures 1 and 2, lever arm 11b carries one contact of a two-way switch S mounted in the movable yoke 40 and operates either to open the switch or to close either of circuits A or B. These circuits serve to energize the coils of motor M for changing or regulating the position of the valves which control the hot water flow either through or around the boiler HB. When the lever 11 is in an intermediate position, both circuits A and B are open and the reversible motor M remains stationary. In this position the control valves remain in whatever position they happen to be when the circuit is broken and the ratio of hot water to recirculated water remains constant until either circuit A or B is closed and the motor M started to change the position of the control valves. When the outside temperature remains constant and the position of lever 11 is not shifted, if the temperature of the water circulating in the pipes P drops, the bellows 13 will contract, extension element 16a which is connected to yoke 40 will move vertically downward and the end of lever arm 11b will contact with the upper contact of switch S to close circuit A, thereby actuating the reversible motor M, which in turn slowly opens the butterfly valve 35 in the passage from the heating boiler HB and correspondingly closes the valve 37 in the by-pass. In this way a greater portion of the water is caused to circulate through the boiler HB and more hot water is introduced into the circulatory system and the temperature of the circulating water rises. When the temperature has risen sufficiently to maintain the desired temperature in the heat exchange medium, the bellows 13 will expand and move the extension 16a and yoke 40 so as to break the circuit A and stop further movement of the motor M. If the temperature of the circulating water should continue to rise, extension element 16a will move yoke 40 into such a position that the lower contact of switch S will contact the end of arm 11b and circuit B will close, thereby reversing the operation of motor M, closing the butterfly valve 35 in the boiler water passage and opening the butterfly valve 37 in the by-pass to reduce the temperature of the circulating water. As soon as equilibrium is established under the existing conditions, the bellows 13 will again contract breaking the contact of circuit B and stopping the motor M.

If now we assume a condition of changing outdoor temperatures, the position of lever 11 will be changed relative to the contacts of switch S to likewise operate the motor M to control the flow of water to compensate for either increase or decrease of the outdoor temperatures. This is brought about by movement of the extension element 16 which will cause lever arm 11b to take an intermediate position or a position closing circuit A or B, whether bellows 13 expands or contracts or remains stationary. Assuming that lever arm 11b is in an intermediate position, it is seen that a decrease in the outdoor temperature would cause bellows 12 to contract and extension element 16 to move in a direction away from lever arm 10b. Under such conditions the tension of coil spring 17a causes lever arm 10a to move to the left in Figure 1, and lever arm 10b to move to the right, thereby remaining in contact with the yoke 17 of extension element 16. The movement of lever 10 causes cam 18 to move along the contacting surface of the lever arm 11a to move the arm 11a downward and the arm 11b upward. This movement will close the circuit A to start the motor M to open the valve 35 and close the valve 37 to thereby increase the temperature of the water flowing through the pipes P and radiators R to compensate for the decrease in the outdoor temperature. In a like manner, if the outside temperature should rise, the relative movement of levers 10 and 11 would be reversed and circuit B would be closed, which in turn would effectuate a lowering of the temperature of the controlled medium.

In normal operation, the movements of bellows 12 and 13 under the influence of the varying temperatures to which the bulbs 20 and 22 are subjected will take place simultaneously and there will be frequent adjustments of the position of the contacts effecting the circuits A and B to the motor M, and frequent changes in the amount of heat imparted to the water circulated in the pipes P to compensate for increases or decreases in the outside temperature.

Figure 4 shows a heating system similar to Figure 2, with the exception that an off or on type of valve is used to direct the flow of water either through the by-pass circuit or partly through the boiler and partly through the by-pass. The valve regulating the relative flow of water through a heating unit HB and the by-pass may be of the type shown in the patent to Gillett et al., No. 2,181,480, or it may be a valve of the solenoid type. In valves of this type it is only necessary to provide means for opening the valve since the valve is provided with positive means for keeping it normally closed. Consequently circuit B may be omitted and only circuit A used for energizing the solenoid and holding the valve open when the system calls for more heat.

In Figure 4 the hot water boiler is indicated at HB, the outgoing line to the radiators is indicated at R1, the lines from the radiators are indicated at R2 and the pump is indicated at P1. The by-pass is indicated at BP and the valve at SV. The valve SV is normally in closed position to prevent circulation of water through the boiler HB unless the condition of the system calls for more heat, in which event the contact through the circuit to the valve SV will be closed and the valve SV will be held open to permit part circulation of the water through the boiler until sufficient additional heat has been added to the system to satisfy its requirements, whereupon the bulb 22 in the water supply line R1 to the radiators will cause the bellows 13 to expand to break the circuit A to the valve SV and cut off further circulation through the boiler HB.

Referring again to Figure 1, the U-shaped portions of yokes 17 and 40 are provided with pointers 42 and 43, which indicate the outdoor air temperature and the water temperature, respectively, on scales 23 and 24. The U-shaped portion of the yoke 17 has an adjustable stop 27, which is adapted to contact switch 28 which cuts the pump P1 out of operation whenever the outdoor temperature is high enough that no heat is needed in the enclosure and may also be made to cut the entire heating plant. Thermo-sensitive bellows 13 is provided with an adjustment nut 29 which permits the position of the bellows to be varied so as to properly locate the position of the contacts of switch S with reference to the end of lever arm 11b.

It will be clearly understood from the preceding description of my control system that any desired infinitely varied temperature ratio may be maintained between a heating or cooling medium and the space to be heated or cooled, even though the demands for heating or cooling may change over a wide range with changes in outdoor temperatures. The curvature of cam 18 may be selected to give the desired ratio and the cams may be designed or changed to satisfy the requirements of any situation. Cam 18 may be made to conform to the contour of a curve corresponding to the theoretical relationship between the desired temperature variations of the controlled and the controlling medium, or it may be constructed to conform to an empirically derived curve. Thus, it is possible to maintain the temperature of the heat exchange medium relatively constant regardless of whether it is necessary to vary the temperature of the controlled medium as a curvilinear function of the temperature variations in the controlling medium or as mixed linear and curvilinear functions of such variations. For an "ideal" heating system, the cams may be prepared in advance and appropriate cams installed for maintaining relatively constant a predetermined range of desired temperatures in the heat exchange medium. Where the conditions of the installation require special treatment, a cam can be designed and installed for the particular installation.

It will be understood further that the desired predetermined infinite variations in the ratio between the temperature variations of the control medium and the controlled medium may be achieved by applying the principles of this invention to a temperature controller using a single lever rather than a plurality of levers. It will be understood also that the surface 10c of the lever arm 10 may be designed as a cam surface to give partial or complete control over the relationship of the levers 10 and 11. Likewise, the desired ratios between the temperature variations of the control and the controlled medium may be procured by a proper correlation of the curvatures of two or more contact surfaces. Obviously, it is preferable to effectuate the desired result by varying a single contact surface in accordance with the embodiment described herein.

The present invention is not limited to the details nor to the exact procedures described herein, but contemplates all applications of the methods and structures herein described which are within the scope of the appended claims.

I claim:

1. In a circulating fluid heating system having means to add heat to the circulating fluid of said system, apparatus for controlling the addition of heat to said fluid comprising a thermostat responsive to outside air temperature, a thermostat responsive to the circulating fluid temperature, a lever system operated by one of said thermostats, said lever system cooperating with means operated by the other thermostat to control the addition of heat to said circulating fluid, and means predeterminedly curvilinearly changing the movement of said lever system by one of said thermostats relative to the means operated by the other thermostat at a greater rate as outside temperature decreases.

2. In a circulating fluid heating system having means to add heat to the circulating fluid of said system, apparatus for controlling the addition of heat to said fluid comprising a thermostat linearly responsive to outside air temperature, a thermostat linearly responsive to the circulating fluid temperature, a lever system operated by one of said thermostats, said lever system cooperating with means operated by the other thermostat to control the addition of heat to said circulating fluid, and means connected in said lever system predeterminedly curvilinearly changing the movement of said lever system by one of said thermostats relative to the means operated by the other thermostats at a greater rate as the outside temperature decreases.

3. In a circulating fluid heating system having means to add heat to the circulating fluid of said system, apparatus for controlling the addition of heat to said fluid comprising a thermostat responsive to outside temperature, a thermostat responsive to circulating fluid temperature, a lever operated by one of said thermostats in linear relation to the temperature to which said thermostat is responsive, a control lever, means operated by the other thermostat in linear relation to the temperature to which said other thermostat is responsive, said means being cooperable with said control lever to control the supply of heat to said circulating fluid, and a curvilinear means operatively associated with said levers predeterminedly changing movement of said control lever by said lever at a greater rate as the outside temperature decreases.

4. In a circulating fluid heating system having means to add heat to the circulating fluid of said system, apparatus for controlling the addition of heat to said fluid comprising a thermostat responsive to outside temperature, a thermostat responsive to circulating fluid temperature, a lever operated by one of said thermostats in linear relation to the temperature to which said thermostat is responsive, a control lever, means operated by the other thermostat in linear relation to the temperature to which said other thermostat is responsive, said means being cooperable with said control lever to control the supply of heat to said circulating fluid, and a curvilinear means between said levers predeterminedly changing the movement of said control lever by said other lever at a greater rate as the outside temperature decreases.

5. In a circulating fluid heating system having means to add heat to the circulating fluid of said system, apparatus for controlling the addition of heat to said fluid comprising a thermostat responsive to outside temperature, a thermostat responsive to circulating fluid temperature, a lever operated by one of said thermostats in linear relation to the temperature to which said thermostat is responsive, a control lever, means operated by the other thermostat in linear relation to the temperature to which said other thermostat is responsive, said means being cooperable with said control lever to control the supply of heat to said circulating fluid, and an adjustable curvilinear cam means between said levers for transmitting movement of one lever to the other lever at a greater rate as the outside temperature decreases.

6. In a circulating fluid heating system having means to add heat to the circulating fluid of said system, apparatus for controlling the addition of heat to said fluid comprising a thermostat responsive to outside temperature, a thermostat responsive to circulating fluid temperature, a lever operated by one of said thermostats in linear relation to the temperature to which said thermostat is responsive, a control lever having switch contacts thereon, means operated by the other thermostat in linear relation to the temperature to which said other thermostat is responsive, said means having switch contacts cooperable with the switch contacts of said control lever to control the supply of heat to said circulating fluid, and a curvilinear cam means operatively connecting said levers and changing the movement of said control lever by said other lever at a greater rate as the outside temperature decreases.

7. In a hot water circulating heating system, means to heat said water, a by-pass for said heating means, means to circulate said water in said system, a thermostat linearly responsive to outdoor temperature, a thermostat linearly responsive to the circulating water temperature, a lever system operable by one of said thermostats, means operable by the other thermostat cooperating with said lever system for controlling said by-pass, and means connected to said lever system predeterminedly curvilinearly changing the movement of said system relative to the thermostat operating said lever system at a greater rate as the outside temperature decreases.

CLIFFORD H. McCLAIN.